US012547583B2

(12) United States Patent
Coady et al.

(10) Patent No.: US 12,547,583 B2
(45) Date of Patent: *Feb. 10, 2026

(54) QUANTUM FILE MANAGEMENT SYSTEM

(71) Applicant: Red Hat, Inc., Raleigh, NC (US)

(72) Inventors: Stephen Coady, Dublin (IE); Leigh Griffin, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,497

(22) Filed: Jan. 19, 2024

(65) Prior Publication Data

US 2024/0184742 A1   Jun. 6, 2024

Related U.S. Application Data

(63) Continuation of application No. 16/859,571, filed on Apr. 27, 2020, now Pat. No. 11,886,380.

(51) Int. Cl.
*G06F 16/18* (2019.01)
*G06F 16/11* (2019.01)
*G06F 16/13* (2019.01)

(52) U.S. Cl.
CPC ............ *G06F 16/11* (2019.01); *G06F 16/13* (2019.01); *G06F 16/18* (2019.01)

(58) Field of Classification Search
CPC .......... G06F 16/11; G06F 16/13; G06F 16/18; G06N 10/00; G06N 10/80
USPC ................ 707/802, 803, 821, 822, E17.014; 706/62, 45
See application file for complete search history.

(56) References Cited

U.S. PATENT DOCUMENTS

| | | |
|---|---|---|
| 7,451,292 B2 | 11/2008 | Routt |
| 7,639,035 B2 | 12/2009 | Berkley |
| 7,853,011 B2 | 12/2010 | Kuang et al. |
| 8,102,185 B2 | 1/2012 | Johansson et al. |
| 8,434,027 B2 | 4/2013 | Jones |
| 8,600,051 B2 | 12/2013 | Noh |
| 8,959,115 B2 | 2/2015 | Marathe |
| 9,264,226 B2 | 2/2016 | Harrison et al. |

(Continued)

FOREIGN PATENT DOCUMENTS

| | | |
|---|---|---|
| CN | 105164704 | 7/2018 |
| CN | 109816112 | 5/2019 |

(Continued)

OTHER PUBLICATIONS

Barnum, H. et al., "Authentication of Quantum Messages," Forty-third Annual Institute of Electrical and Electronics Engineers Symposium on Foundations of Computer Science, Nov. 2002, 10 pages.

(Continued)

*Primary Examiner* — Md I Uddin
(74) *Attorney, Agent, or Firm* — Dority & Manning, P.A.

(57) ABSTRACT

A quantum file management system is disclosed. A quantum file manager receives, from a requestor, a request to access a quantum file that comprises a plurality of qubits. The quantum file manager determines, for each respective qubit of the plurality of qubits, a qubit identifier of the respective qubit. The quantum file manager sends, to the requestor in response to the request, information that includes the qubit identifier for each respective qubit of the plurality of qubits.

16 Claims, 13 Drawing Sheets

(56) References Cited

U.S. PATENT DOCUMENTS

| | | | |
|---|---|---|---|
| 9,495,644 | B2 | 11/2016 | Chudak et al. |
| 9,509,506 | B2 | 11/2016 | Hughes et al. |
| 9,537,953 | B1 | 1/2017 | Dadashikelayeh et al. |
| 9,774,401 | B1 | 9/2017 | Borrill |
| 9,847,913 | B2 | 12/2017 | Kanda et al. |
| 9,887,976 | B2 | 2/2018 | Hughes et al. |
| 10,331,658 | B2 | 6/2019 | Pennefather et al. |
| 10,592,216 | B1 | 3/2020 | Richardson et al. |
| 2003/0121028 | A1 | 6/2003 | Coury et al. |
| 2005/0193221 | A1 | 9/2005 | Yoneyama |
| 2012/0093521 | A1 | 4/2012 | Harrison et al. |
| 2012/0124092 | A1 | 5/2012 | Teranishi et al. |
| 2013/0308956 | A1 | 11/2013 | Meyers et al. |
| 2014/0254660 | A1 | 9/2014 | La |
| 2014/0365843 | A1 | 12/2014 | Ashikhmin |
| 2016/0071021 | A1 | 3/2016 | Raymond |
| 2016/0321316 | A1* | 11/2016 | Pennefather .......... G06F 16/148 |
| 2017/0351974 | A1 | 12/2017 | Rose et al. |
| 2018/0091440 | A1 | 3/2018 | Dadashikelayeh et al. |
| 2018/0144262 | A1 | 5/2018 | Roetteler et al. |
| 2018/0181685 | A1 | 6/2018 | Roetteler et al. |
| 2018/0336371 | A1 | 11/2018 | Fortmann et al. |
| 2018/0365585 | A1 | 12/2018 | Smith et al. |
| 2019/0042971 | A1 | 2/2019 | Zou |
| 2019/0179730 | A1 | 6/2019 | Geller et al. |
| 2019/0378032 | A1 | 12/2019 | Kliuchnikov et al. |
| 2020/0074346 | A1* | 3/2020 | Griffin .................. G06N 20/00 |
| 2020/0125402 | A1 | 4/2020 | Griffin et al. |
| 2020/0133947 | A1 | 4/2020 | Wang |
| 2020/0184025 | A1 | 6/2020 | Horii et al. |
| 2020/0184031 | A1 | 6/2020 | Horii |
| 2020/0201655 | A1 | 6/2020 | Griffin et al. |
| 2020/0227522 | A1 | 7/2020 | Leipold et al. |
| 2020/0272926 | A1 | 8/2020 | Chaplin et al. |
| 2020/0301562 | A1 | 9/2020 | Gupta et al. |
| 2020/0313063 | A1 | 10/2020 | Pollanen et al. |
| 2020/0358187 | A1 | 11/2020 | Tran et al. |
| 2020/0374211 | A1 | 11/2020 | Griffin et al. |
| 2020/0387821 | A1 | 12/2020 | Griffin et al. |
| 2021/0027188 | A1 | 1/2021 | Nickerson et al. |
| 2021/0036846 | A1 | 2/2021 | Grice et al. |
| 2021/0058243 | A1 | 2/2021 | Starodubtsev |
| 2021/0182234 | A1* | 6/2021 | Beigi .................. G06N 10/70 |
| 2021/0182724 | A1 | 6/2021 | Zou et al. |
| 2021/0303155 | A1 | 9/2021 | Meister et al. |
| 2021/0334237 | A1* | 10/2021 | Coady .................. G06F 16/18 |
| 2022/0269976 | A1* | 8/2022 | Wang .................. G06N 10/00 |
| 2023/0040289 | A1* | 2/2023 | Sels .................. G06N 10/60 |

FOREIGN PATENT DOCUMENTS

| | | |
|---|---|---|
| CN | 114503027 | 5/2022 |
| JP | 6465876 | 2/2019 |
| WO | WO 2016206498 | 12/2016 |
| WO | WO 2018111242 | 6/2018 |

OTHER PUBLICATIONS

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" Wired, Mar. 15, 2017, https://www.wired.com/2017/03/quantum-computers-used-hard-drives-made-dna/, 10 pages.

Cheng, S.T. et al., "Quantum Switching and Quantum Merge Sorting," Institute of Electrical and Electronics Engineers Transactions on Circuits and Systems I: Regular Papers, vol. 53, Issue 2, Feb. 2006, 10 pages.

Choi, C., "A Data Bus for Quantum Computers," Institute of Electrical and Electronics Engineers Spectrum, Nov. 9, 2017, https://spectrum.ieee.org/tech-talk/computing/hardware/a-quantum-bus-for-quantum-computers, 3 pages.

Gühne, O., et al., "Entanglement Detection," Physics Reports, vol. 474, No. 1, Feb. 27, 2009, 90 pages.

Lee, C., "New Form of Qubit Control May Yield Longer Computation Times," Ars Technica, Jan. 26, 2018, Wired Media Group, 5 pages.

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203.pdf, 2 pages.

Sillanpaa, M. et al., "Coherent Quantum State Storage and Transfer Between Two Phase Qubits Via a Resonant Cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation.%20of%20Quantum%20Merging%20Negative.pdf, 5 pages.

Whitehouse, L., "Data deduplication methods: Block-level versus byte-level dedupe," Nov. 24, 2008, https://www.techtarget.com/searchdatabackup/tip/Data-deduplication-methods-Block-level-versus-byte-level-dedupe, 2 pages.

Yamasaki, H. et al., "Quantum State Merging for Arbitrarily Small-Dimensional Systems," Institute of Electrical and Electronics Engineers Transactions on Information Theory, vol. 65, No. 6, Jun. 2019, pp. 3950-3972.

Yang, C., et al., "Entanglement Generation and Quantum Information Transfer Between Spatially-Separated Qubits In Different Cavities," New Journal of Physics, vol. 15, Nov. 1, 2013, 19 pages.

Notice of Allowance for U.S. Appl. No. 16/227,747, mailed Jun. 10, 2021, 7 pages.

Non-Final Office Action for U.S. Appl. No. 15/930,025, mailed Oct. 1, 2021, 10 pages.

Applicant-Initiated Interview Summary for U.S. Appl. No. 15/930,025, mailed Dec. 17, 2021, 3 pages.

Notice of Allowance for U.S. Appl. No. 16/912,200, mailed Oct. 13, 2022, 9 pages.

Notice of Allowance for U.S. Appl. No. 16/912,091, mailed Sep. 14, 2022, 10 pages.

Notice of Allowance and Examiner-Initiated Interview Summary for U.S. Appl. No. 15/930,025, mailed Apr. 8, 2022, 13 pages.

Notice of Allowance, Examiner's Amendment, and Examiner-Initiated Interview Summary for U.S. Appl. No. 16/912,045, mailed Oct. 4, 2022, 12 pages.

Non-Final Office Action for U.S. Appl. No. 16/909,477, mailed Sep. 30, 2022, 34 pages.

Non-Final Office Action for U.S. Appl. No. 16/912,200, mailed May 12, 2022, 39 pages.

Non-Final Office Action for U.S. Appl. No. 16/912,045, mailed Apr. 14, 2022, 9 pages.

Non-Final Office Action for U.S. Appl. No. 16/859,571, mailed May 20, 2022, 21 pages.

Final Office Action and Examiner Interview Summary for U.S. Appl. No. 16/859,571, mailed Dec. 8, 2022, 14 pages.

Non-Final Office Action for U.S. Appl. No. 16/859,571, mailed Oct. 28, 2021, 9 pages.

Final Office Action for U.S. Appl. No. 16/912,091, mailed Jun. 20, 2022, 14 pages.

Non-Final Office Action for U.S. Appl. No. 16/912,091, mailed Jan. 27, 2022, 14 pages.

Non-Final Office Action for U.S. Appl. No. 16/884,928, mailed Nov. 4, 2022, 49 pages.

Notice of Allowance for U.S. Appl. No. 16/909,477, mailed Feb. 2, 2023, 13 pages.

Non-Final Office Action for U.S. Appl. No. 17/883,280, mailed Jan. 18, 2023, 22 pages.

Non-Final Office Action for U.S. Appl. No. 16/859,571, mailed Jun. 8, 2023, 17 pages.

(56) References Cited

OTHER PUBLICATIONS

Final Office Action for U.S. Appl. No. 16/884,928, mailed May 22, 2023, 39 pages.
Notice of Allowance and Notice of Allowability for U.S. Appl. No. 17/883,280, mailed Aug. 30, 2023, 11 pages.
Non-Final Office Action for U.S. Appl. No. 16/884,928, mailed Oct. 5, 2023, 28 pages.
Corrected Notice of Allowability for U.S. Appl. No. 16/859,571, mailed Oct. 6, 2023, 13 pages.
Notice of Allowance and Notice of Allowability for U.S. Appl. No. 16/859,571, mailed Sep. 26, 2023, 20 pages.
U.S. Appl. No. 16/227,747, filed Dec. 20, 2018.
U.S. Appl. No. 15/930,025, filed May 12, 2020.
U.S. Appl. No. 16/884,928, filed May 27, 2020.
U.S. Appl. No. 16/859,571, filed Apr. 27, 2020.
U.S. Appl. No. 16/912,045, filed Jun. 25, 2020.
U.S. Appl. No. 16/912,091, filed Jun. 25, 2020.
U.S. Appl. No. 16/912,200, filed Jun. 25, 2020.
U.S. Appl. No. 16/909,477, filed Jun. 23, 2020.

* cited by examiner

QUANTUM FILE MANAGEMENT SYSTEM

RELATED APPLICATION

This application is a continuation of co-pending U.S. patent application Ser. No. 16/859,571, filed on Apr. 27, 2020, entitled "QUANTUM FILE MANAGEMENT SYSTEM," the disclosure of which is hereby incorporated herein by reference in its entirety.

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement a quantum file management system that operates to create quantum files that comprise a plurality of qubits. The quantum file management system maintains real-time status information about the qubits in a file, and controls access to the quantum files. The quantum file management system may perform instantaneous safety checks on the qubits of a quantum file prior to providing access to the quantum file so that a quantum file requestor can ensure that the qubits can be safely accessed.

In one embodiment a method is disclosed. The method includes receiving, by a quantum file manager executing on at least one processor device, from a requestor, a request to access a quantum file that comprises a plurality of qubits. The method further includes determining, by the quantum file manager, for each respective qubit of the plurality of qubits, a qubit identifier of the respective qubit. The method further includes sending, to the requestor in response to the request, information that includes the qubit identifier for each respective qubit of the plurality of qubits.

In another embodiment a quantum computing system is disclosed. The quantum computing system includes a memory, and at least one processor device coupled to the memory. The at least one processor device is to receive, by a quantum file manager executing on the at least one processor device, from a requestor, a request to access a quantum file that comprises a plurality of qubits. The at least one processor device is further to determine, by the quantum file manager, for each respective qubit of the plurality of qubits, a qubit identifier of the respective qubit. The at least one processor device is further to send, to the requestor in response to the request, information that includes the qubit identifier for each respective qubit of the plurality of qubits.

In another embodiment a computer program product is disclosed. The computer program product is stored on a non-transitory computer-readable storage medium and includes instructions to cause a processor device to receive, by a quantum file manager executing on the at least one processor device, from a requestor, a request to access a quantum file that comprises a plurality of qubits. The instructions are further to cause the processor device to determine, by the quantum file manager, for each respective qubit of the plurality of qubits, a qubit identifier of the respective qubit. The instructions are further to cause the processor device to send, to the requestor in response to the request, information that includes the qubit identifier for each respective qubit of the plurality of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, an ability to programmatically coordinate access to qubits will be desirable.

The examples disclosed herein implement a quantum file management system that operates to create quantum files that comprise a plurality of qubits. The quantum file management system maintains real-time status information about the qubits in a file, and controls access to the quantum files. The quantum file management system may perform instantaneous safety checks on the qubits of a quantum file prior to providing access to the quantum file so that a quantum file requestor can ensure the qubits can be safely accessed.

Figure 1:
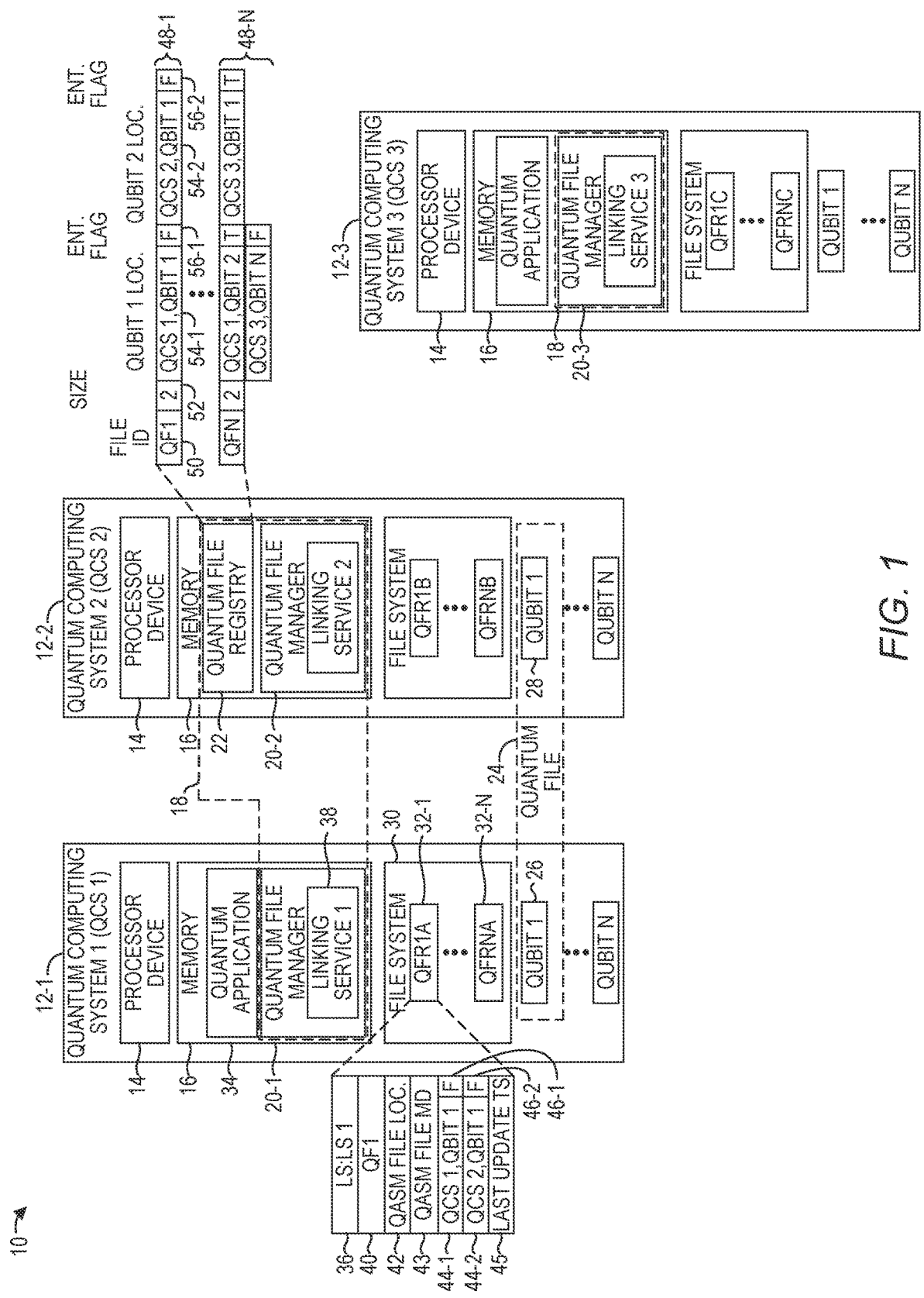
FIG. 1 is a block diagram of an environment according to one example.

FIG. 1 is a block diagram of an environment 10 according to one example. The environment 10 includes a plurality of quantum computing systems 12-1, 12-2 and 12-3 (generally, quantum computing systems 12). The quantum computing systems 12 may be close in physical proximity to one another, or may be relatively long distances from one another, such as hundreds or thousands of miles from one another. The quantum computing systems 12 operate in quantum environments but can operate using classical computing principles or quantum computing principles. When using quantum computing principles, the quantum computing systems 12 perform computations that utilize quantum-mechanical phenomena, such as superposition and entanglement. The quantum computing systems 12 may operate under certain environmental conditions, such as at or near 0° Kelvin. When using classical computing principles, the quantum computing systems 12 utilize binary digits that have a value of either 1 or 0.

Each of the quantum computing systems 12 includes at least one processor device 14 and at least one memory 16. Components of a quantum file management system 18 may be distributed among one or more of the quantum computing systems 12. The quantum file management system 18 includes quantum file managers 20-1-20-3 which operate to implement quantum files on the quantum computing systems 12-1, 12-2 and 12-3, respectively. The quantum file management system 18 also includes a quantum file registry 22 that includes metadata regarding each quantum file implemented in the environment 10, as discussed in greater detail below.

In this example, a quantum file 24 has been implemented in the environment 10. The quantum file 24 is made up of two qubits: a qubit 26 hosted on the quantum computing system 12-1, and a qubit 28 hosted on the quantum computing system 12-2. Mechanisms for generating a quantum file will be discussed below. The quantum file 24, at the point in time illustrated in FIG. 1, is "owned" by the quantum computing system 12-1. As will be discussed below, ownership of the quantum file 24 may be migrated or otherwise transitioned from one quantum computing system 12 to another quantum computing system 12.

The quantum computing system 12-1 includes a file system 30 that includes one or more quantum file references 32-1-32-N (generally, quantum file references 32). Each quantum file reference 32 corresponds to a quantum file maintained in the quantum file registry 22, and that is "owned" by the quantum computing system 12-1. In this example, the quantum file reference 32-1 corresponds to the quantum file 24. The quantum file 24 is accessed by a requestor via the quantum file reference 32-1, and the quantum file reference 32-1 is identified by the requestor via an identifier. In this example, the quantum file reference 32-1 has an identifier of QFR1A.

For purposes of illustration, assume that a quantum file requestor, in this example a quantum application 34, seeks access to the quantum file 24. The quantum application 34 provides the quantum file identifier QFR1A to the quantum file manager 20-1. The quantum application 34 may interface with the quantum file manager 20-1 via any suitable inter-process communications mechanism, such as an application programming interface (API) or the like. In some examples, the quantum file manager 20-1 may be an integral part of a quantum operating system, and the appropriate intercommunication mechanisms between the quantum application 34 and the quantum file manager 20-1 may be generated in response to certain programming instructions, such as reading, writing, or otherwise accessing the quantum file 24 while the quantum application 34 is being compiled.

The quantum file manager 20-1 accesses the file system 30. Based on the quantum file identifier QFR1A, the quantum file manager 20-1 accesses the quantum file reference 32-1. The quantum file reference 32-1 includes metadata about the quantum file 24. In particular, a linking service field 36 identifies a quantum linking service (hereinafter "linking service" for purposes of brevity) associated with the quantum file 24. In this example, the linking service field 36 identifies a linking service 38 as being associated with the quantum file 24.

An internal identifier field 40 identifies an internal quantum file identifier for the quantum file 24. In this example, the internal quantum file identifier is "QF1". In some examples, the quantum file reference 32-1 may include a quantum assembly file (QASM) field 42 that identifies the location of a QASM file that contains programming instructions that access the quantum file 24. The quantum file reference 32-1 may also include a metadata field 43 that identifies information about the quantum file 24, such as, by way of non-limiting example, a creation timestamp of the quantum file 24, a last modification timestamp of the quantum file 24, a current user of the quantum file 24, and the like. The quantum file reference 32-1 identifies each qubit that makes up the quantum file 24, in this example the qubits 26 and 28. In particular, a first qubit identifier field 44-1 contains a qubit identifier of the qubit 26, and a second qubit identifier field 44-2 contains a qubit identifier of the qubit 28. The qubits 26 and 28 may be identified in any desired manner. In some examples, a qubit identifier includes information that identifies the particular quantum computing system 12-1-12-3 on which the qubit is located and a qubit reference number that uniquely corresponds to a particular qubit on the identified quantum computing system 12-1-12-3.

In some examples, data may be spread over the qubits 26, 28 in a manner that dictates that the qubits 26, 28 must be accessed in some sequential order for the data to have contextual meaning. The order in which the qubits 26, 28 are identified in the quantum file reference 32-1 may correspond to the appropriate order in which the qubits 26, 28 should be accessed. In other examples, the quantum file reference 32-1 may have an additional field identifying the appropriate order.

A qubit entanglement status field 46-1 maintains entanglement status information about the qubit 26. In this particular example, the qubit entanglement status field 46-1 indicates that, at the time of the last update of the quantum file reference 32-1, the qubit 26 was not in an entangled state with any other qubit. Similarly, a qubit entanglement status field 46-2 maintains entanglement status information about the qubit 28. The qubit entanglement status field 46-2 indicates that, at the time of the last update of the quantum file reference 32-1, the qubit 28 was not in an entangled state with any other qubit.

A timestamp field 45 identifies a time of last update of the quantum file reference 32-1. The timestamp field 45 may be used, for example, by the quantum file manager 20-1 to determine whether the quantum file registry 22 needs to be accessed to obtain real-time information or not. For example, if the timestamp field 45 indicates that the quantum file reference 32-1 was last updated within a predetermined timeframe, such as, by way of non-limiting example, within the previous 0.001 seconds, the quantum file manager 20-1 may decide that the information in the quantum file reference 32-1 is sufficiently up to date such that the quantum file registry 22 need not be accessed.

The quantum file management system 18 implements a real time, instantaneous updating of the quantum file reference 32-1 prior to granting access to the quantum file 24, for example, prior to granting access to a quantum application that is attempting to read any qubit in the quantum file 24. In particular, the quantum file manager 20-1 causes the quantum linking service 38 to access the quantum file registry 22 to determine a current status of the quantum file 24. The quantum file registry 22 comprises a plurality of quantum file records 48-1-48-N (generally, "quantum file records 48"), each of which corresponds to a quantum file implemented in the environment 10. In this example, the quantum file record 48-1 corresponds to the quantum file 24.

The quantum file record 48-1 includes current metadata regarding the quantum file 24. The metadata may include an internal identifier field 50 that identifies an internal file identifier of the quantum file 24, a size field 52 that identifies the number of qubits that make up the quantum file 24, and for each qubit of the number of qubits that make up the quantum file 24, a qubit identification field and an entanglement status field. In this example, a qubit identification field 54-1 contains a qubit identifier that identifies the qubit 26, and a qubit identification field 54-2 contains a qubit identifier that identifies the qubit 28. An entanglement field 56-1 indicates that the qubit 26 is not currently in an entangled state with any other qubit, and an entanglement field 56-2 indicates that the qubit 28 is not currently in an entangled state with any other qubit. Although not illustrated, the quantum file record 48-1 may also include additional metadata regarding the quantum file 24 as discussed above with regard to the metadata field 43 of the quantum file reference 32-1, such as, by way of non-limiting example, a creation timestamp of the quantum file 24, a last modification timestamp of the quantum file 24, a current user (e.g., current quantum application or current quantum service) of the quantum file 24, and the like.

The linking service 38 or the quantum file registry 22, in response to the query from the linking service 38, may then initiate one or more checks on the quantum file 24. The checks may include whether or not one or more of the qubits 26, 28 are currently in an entangled state. Determining whether a qubit is in an entangled state may be done in any number of ways, such as checking a metadata field, accessing one or more QASM files that include instructions performed on one or both of the qubits 26, 28, or the like. The checks may also include a determination of whether the quantum file 24 is currently being accessed by other quantum applications, or by a quantum service, such as disclosed in U.S. patent application Ser. No. 16/227,747, the disclosure of which is hereby incorporated by reference herein. The results of these checks may cause an updating of one or more of the entanglement fields 56-1, 56-2. Where other checks are made, the quantum file record 48-1 may include additional fields that identify the outcome of such checks.

The linking service 38 updates the quantum file reference 32-1 with the information from the quantum file record 48-1 and the outcome of any checks, and also updates the timestamp field 45 with the current time. The quantum file manager 20-1 then returns control to the quantum application 34, passing the quantum application 34 at least some of the updated information contained in the quantum file reference 32-1, such as the first qubit identifier field 44-1 and the second qubit identifier field 44-2, and the qubit status information contained in the qubit entanglement status fields 46-1, 46-2. The quantum application 34 may then initiate actions against the qubits 26, 28, such as read actions, write actions, or the like.

Figure 2:
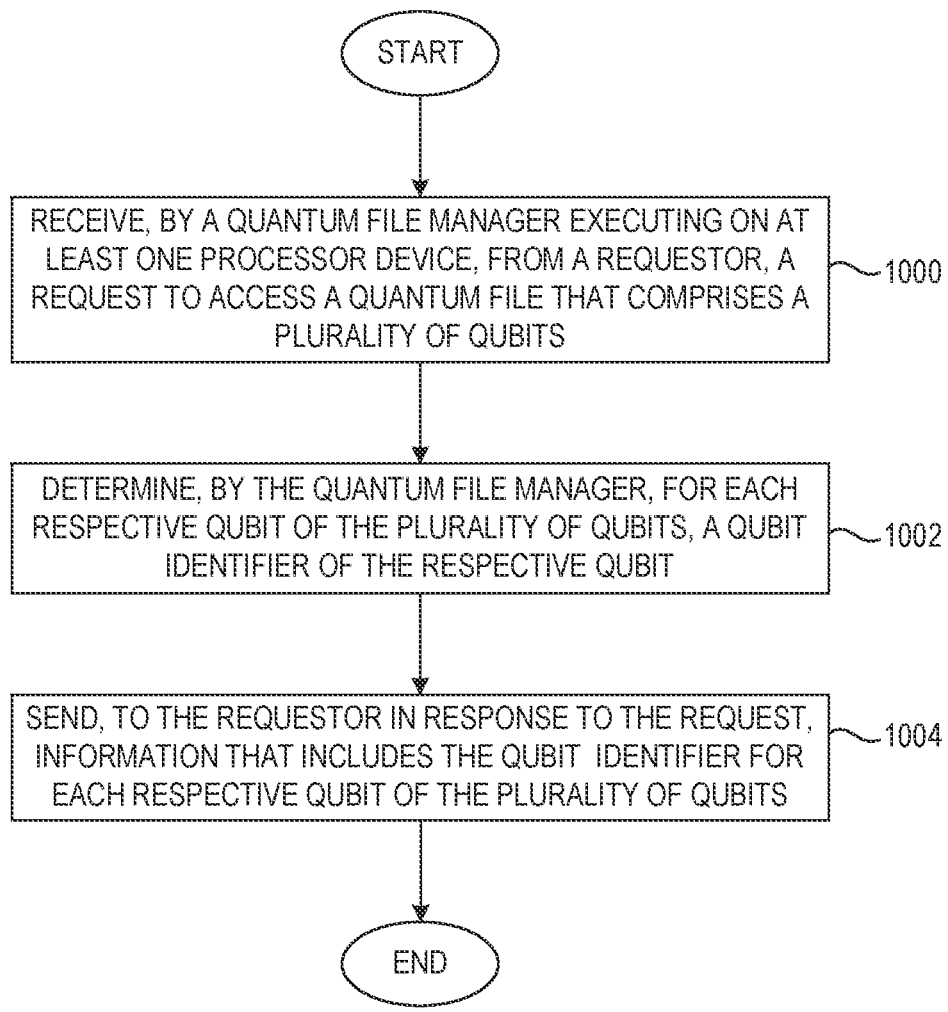
FIG. 2 is a flow chart of a method implemented by a quantum file management system according to one example.

FIG. 2 is a flow chart of a method implemented by a quantum file management system according to one example. FIG. 2 will be discussed in conjunction with FIG. 1. The quantum file manager 20-1, executing on at least one processor device 14, receives, from the quantum application 34, a request to access the quantum file 24 that comprises the qubits 26, 28 (FIG. 2, block 1000). The quantum file manager 20-1 determines, for each respective qubit 26, 28, a qubit identifier of the respective qubit 26, 28 (FIG. 2, block 1002). The quantum file manager 20-1 sends, to the quantum application 34 in response to the request, information that includes the qubit identifier for each of the qubits 26, 28 (FIG. 2, block 1004).

Figure 3:
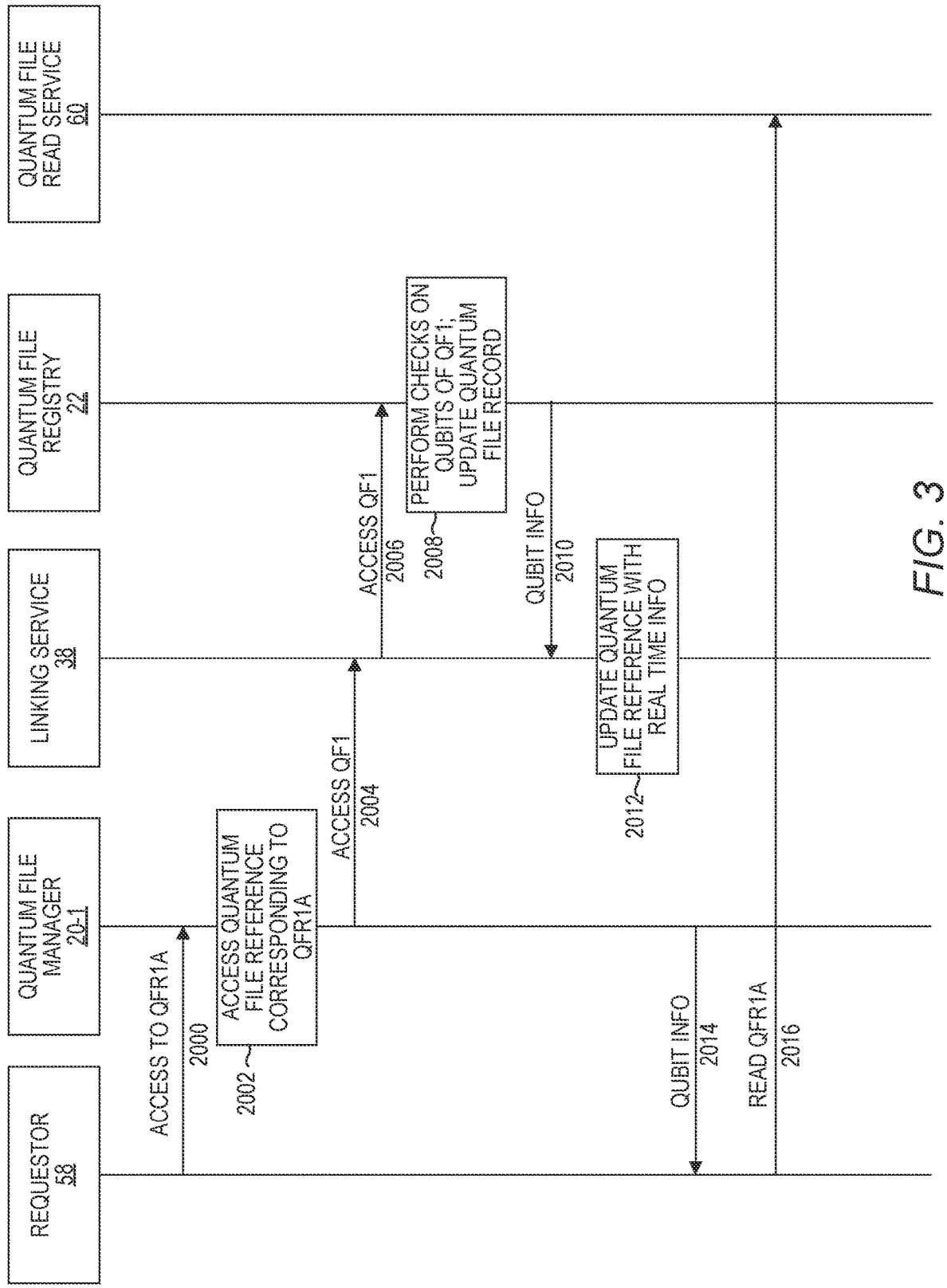
FIG. 3 is a message sequence diagram illustrating messages communicated between components and actions taken by components of a quantum file management system according to one example.

FIG. 3 is a message sequence diagram illustrating messages communicated between components and actions taken by components of the quantum file management system 18 according to one example. A requestor 58, such as, in one example, the quantum application 34, sends an access message to the quantum file manager 20-1 that requests access to the quantum file 24 (FIG. 3, block 2000). The quantum file manager 20-1 accesses the quantum file reference 32-1 that corresponds to the quantum file 24 (FIG. 3, block 2002). The quantum file manager 20-1 requests an update to the quantum file reference 32-1 via the linking service 38 (FIG. 3, block 2004). The linking service 38 sends an access request for the quantum file 24 to the quantum file registry 22 (FIG. 3, block 2006).

The quantum file registry 22 accesses the quantum file record 48-1, which corresponds to the quantum file 24, and performs one or more safety checks on the qubits 26 and 28. The safety checks may include, for example, whether the state of entanglement of the qubits 26 and 28 is an entangled state or a not entangled state (FIG. 3, block 2008). The quantum file registry 22 updates the quantum file record 48-1, as needed, and then sends information about the qubits 26, 28 to the linking service 38 (FIG. 3, block 2010). The information may include, for example, the current qubit identifiers of the qubits 26 and 28, their states of entanglement, and the like. The linking service 38 receives the information and updates the quantum file reference 32-1 with the information (FIG. 3, block 2012). The quantum file manager 20-1 returns to the requestor 58 qubit information, such as the qubit identifiers of the qubits 26 and 28 and the their state of entanglement (FIG. 3, block 2014). The requestor 58 may then determine that, based on the qubits 26 and 28 not being in an entangled state, to access the quantum file 24. The requestor 58 may then issue a read request to a quantum file read service 60 (FIG. 3, block 2016).

Figure 4A:
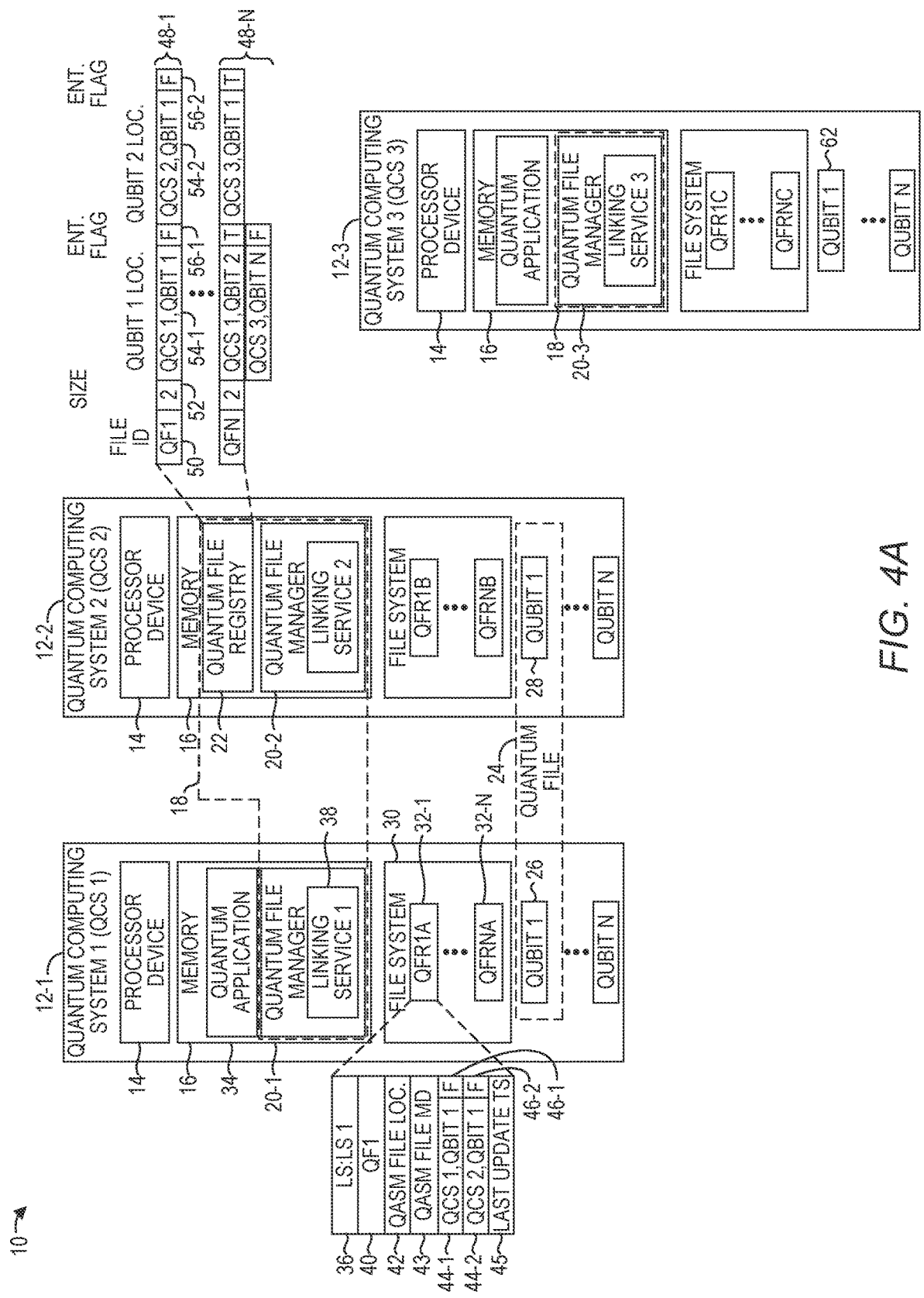
FIG. 4A is a block diagram illustrating the environment illustrated in FIG. 1 before information has been migrated, or copied, from one qubit to another qubit, according to one example.
Figure 4B:
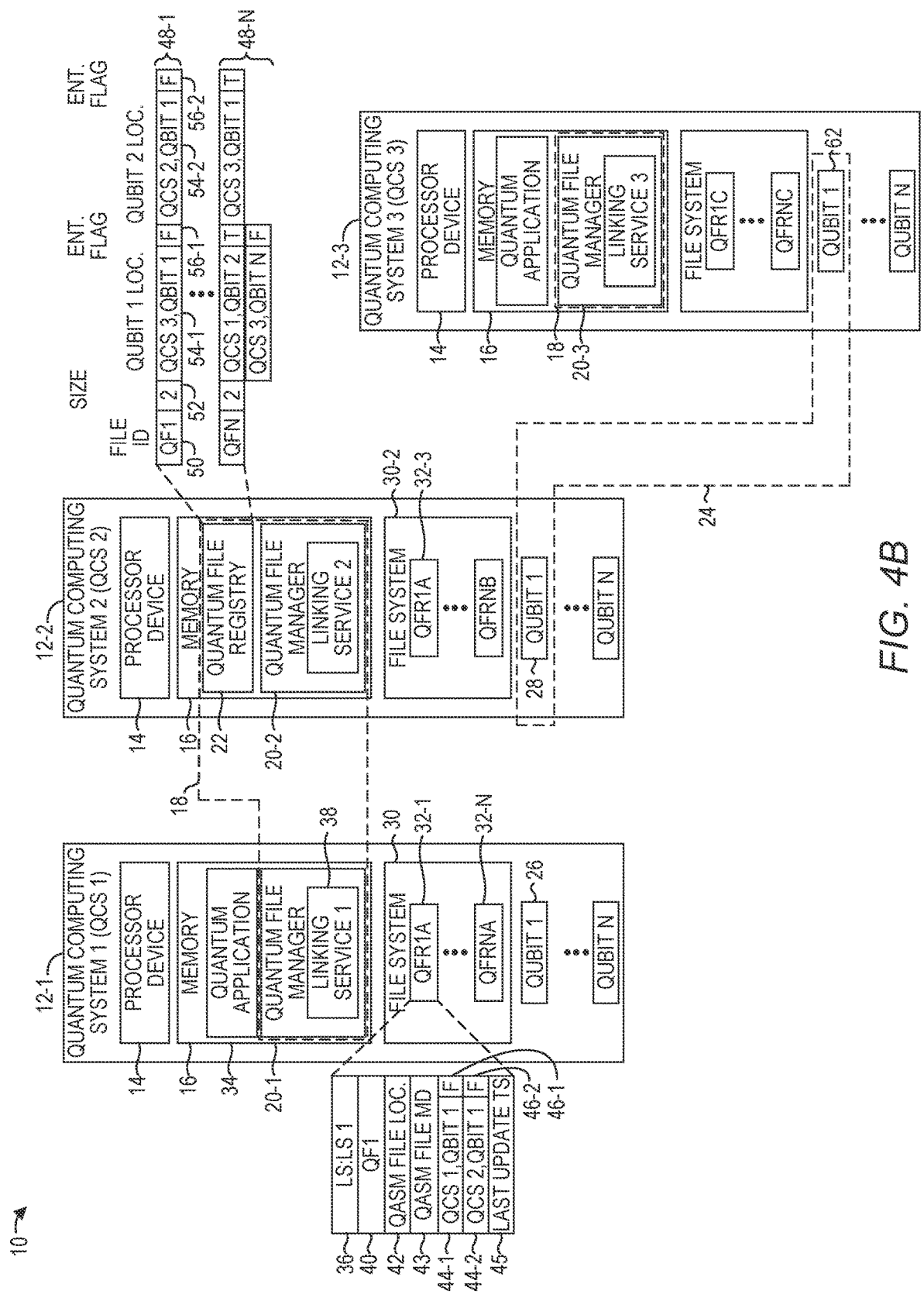
FIG. 4B is a block diagram illustrating the environment after information has been migrated, or copied, from one qubit to another qubit, according to one example.

FIGS. 4A-4B are block diagrams illustrating the environment 10 at two points in time, respectively. FIG. 4A illustrates the environment 10 before information has been migrated, or copied, from one qubit to another qubit, according to one example, and FIG. 4B illustrates the environment 10 after information has been migrated, or copied, from one qubit to another qubit. Referring first to FIG. 4A, the quantum file 24 comprises the qubits 26 and 28, as discussed above with regard to FIGS. 1 and 2. An operator desires to copy the data from the qubit 26 to a qubit 62 implemented on the quantum computing system 12-3. In one example, the operator may interact with the quantum file manager 20-1 to initiate a copy of the data from the qubit 26 to a qubit 62. Referring now to FIG. 4B, the quantum file manager 20-1 initiates a quantum copy process that copies the data from the qubit 26 to the qubit 62. When the copy is complete, the quantum file manager 20-1 sends a message to the quantum file registry 22 indicating that the qubit identifier contained in the qubit identification field 54-1 for the quantum file 24 has changed, and provides the qubit identifier of the qubit 62 to the quantum file registry 22. The quantum file registry 22 updates the qubit identification field 54-1 to reflect the qubit 62. Subsequent accesses of the quantum file 24 by the quantum application 34 will cause the process described in FIG. 3 to occur, and the quantum file reference 32-1 at that time will be updated with the current qubit identifiers that identify the qubit 62 and the qubit 28.

In some implementations, the quantum file management system 18 facilitates copying of a quantum file reference 32 from one quantum computing system 12 to another quantum computing system 12. In this manner, requestors executing on different quantum computing systems 12 can get access to the quantum file 24. In particular, upon a request from an operator for example, the quantum file manager 20-1 interacts with the quantum file manager 20-2 to copy the data from the quantum file reference 32-1 to a quantum file reference 32-3 in a file system 30-2 of the quantum computing system 12-2. After the quantum file reference 32-3 has been created and populated with the data from the quantum file reference 32-1, the quantum file manager 20-1 may delete the quantum file reference 32-1 from the file system 30.

Figure 5A:
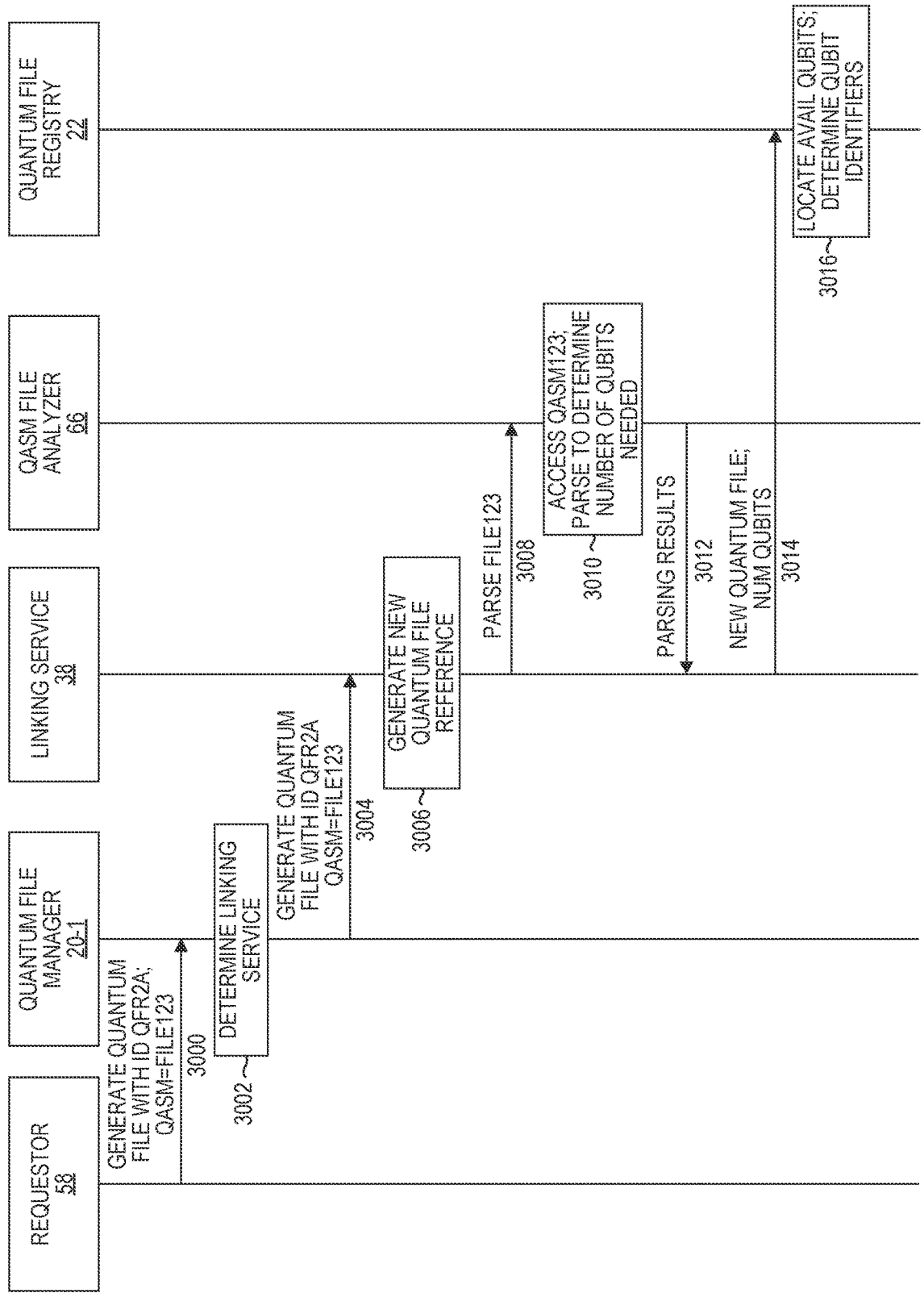
FIGS. 5A-5B are message sequence diagrams illustrating a sequence of messages between components and actions taken by such components to generate a quantum file, in accordance with one example.
Figure 5B:
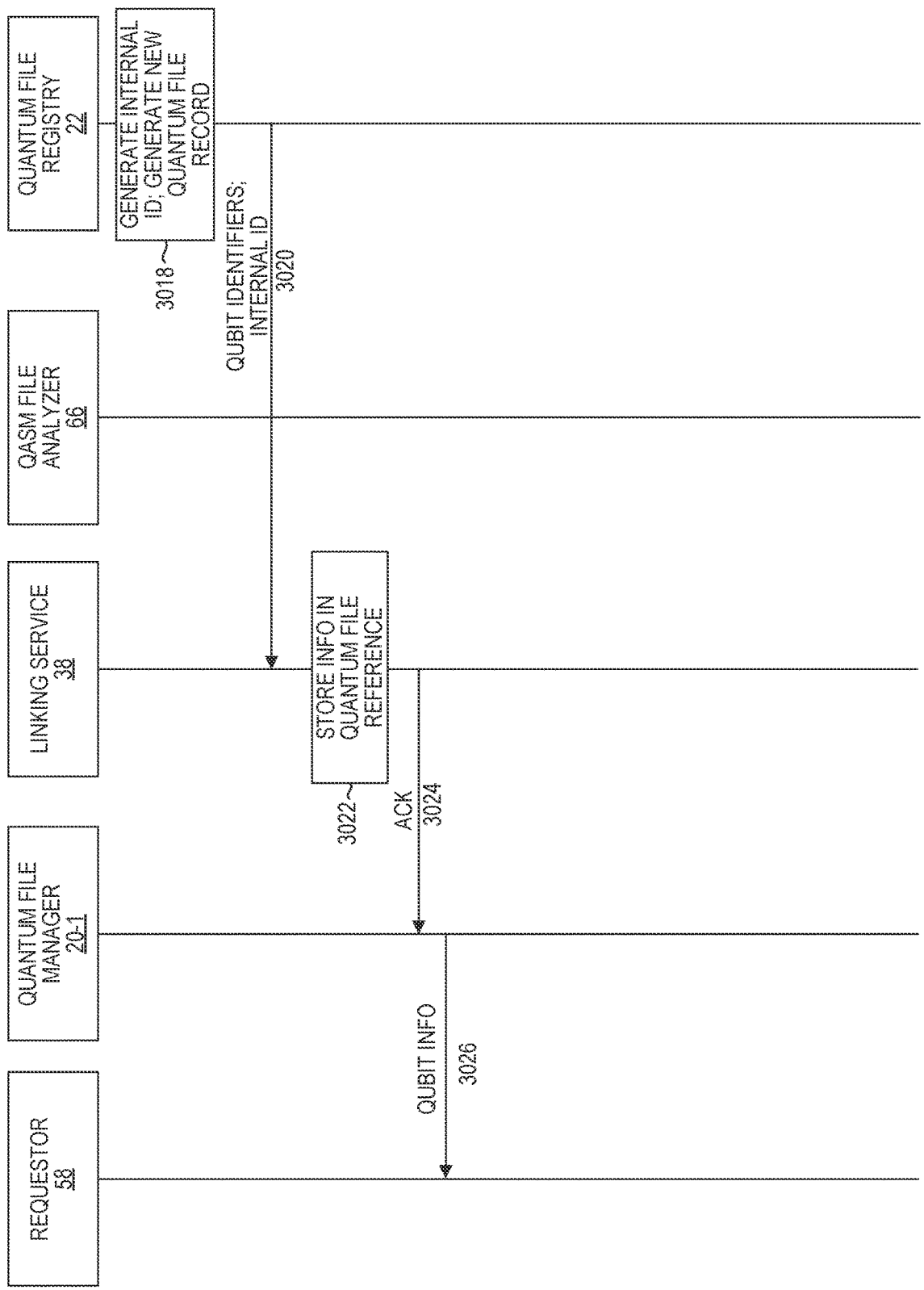

FIGS. 5A-5B are message sequence diagrams illustrating a sequence of messages between components and actions taken by such components to generate a quantum file, in accordance with one example. In this example, quantum file references are maintained as classical, rather than quantum, data. Assume that the requestor 58 desires to generate a new quantum file that is based on an existing QASM file. The requestor 58 may be, by way of non-limiting example, an operator that interacts with a quantum file generation user interface, or an application executing on the quantum computing system 12-1. The request includes a desired external file identifier, in this case "QFR2A", and an identifier of the respective QASM file. The requestor 58 sends the request to the quantum file manager 20-1 (FIG. 5A, block 3000). The quantum file manager 20-1 receives the request, and determines an appropriate linking service to be associated with the new quantum file (FIG. 5A, block 3002). The selection of the linking service may be based on any desired factors or algorithms. In some examples, each quantum computing system 12-1-12-3 may have a single linking service, and the linking service of the respective quantum computing system 12-1-12-3 may be selected for any quantum files generated on the respective quantum computing system 12-1-12-3. In other examples, a quantum computing system 12 may have multiple linking services, and a selection algorithm, such as, by way of non-limiting example, a round-robin selection algorithm, may be used to select a particular linking service. In some examples, the linking service of the quantum computing system 12-1-12-3 that implements a majority of the qubits of the new quantum file may be selected.

Note that the linking service for a quantum file may change over time. For example, if a quantum file reference is moved from one quantum computing system 12 to another quantum computing system 12, as discussed with regard to FIG. 4B for example, the linking service identified in the quantum file reference may be revised to identify a different linking service, such as the linking service that executes on the quantum computing system to which the quantum file reference was moved.

In this example, the quantum file manager 20-1 selects the linking service 38 as the appropriate linking service to be associated with the quantum file. The quantum file manager 20-1 communicates the information received from the requestor 58 to the linking service 38 (FIG. 5A, block 3004). The linking service 38 generates a new quantum file reference (FIG. 5A, block 3006). The linking service 38 sends a parsing request to a QASM file analyzer 66, requesting that the QASM file FILE123 be analyzed to determine a number of qubits needed to execute the QASM file FILE123 (FIG. 5A, block 3008). The QASM file analyzer 66 accesses the QASM file FILE123, and parses the programming instructions in the QASM file FILE123 (FIG. 5A, block 3010). For purposes of illustration, assume that the QASM file analyzer 66 determines that three qubits are needed during the execution of the QASM file FILE123. The QASM file analyzer 66 sends the results of the analysis to the linking service 38 (FIG. 5A, block 3012).

The linking service 38 sends a quantum file creation request to the quantum file registry 22, and provides the number of qubits needed (FIG. 5A, block 3014). The quantum file registry 22 locates three available qubits on the quantum computing systems 12-1-12-3 (FIG. 5A, block 3016). Referring now to FIG. 5B, the quantum file registry 22 generates a new internal file identifier, and stores the new internal file identifier and the qubit identifiers of the three available qubits in a new quantum file record (FIG. 5B, block 3018). The quantum file registry 22 sends the qubit identifiers and the internal identifier to the linking service 38 (FIG. 5B, block 3020). The linking service 38 stores the information in the new quantum file reference (FIG. 5B, block 3022). The linking service 38 informs the quantum file manager 20-1 that the quantum file reference for the file ID QFR2A has been generated (FIG. 5B, block 3024). The quantum file manager 20-1 provides the qubit information to the requestor 58 (FIG. 5B, block 3026).

Figure 6A:
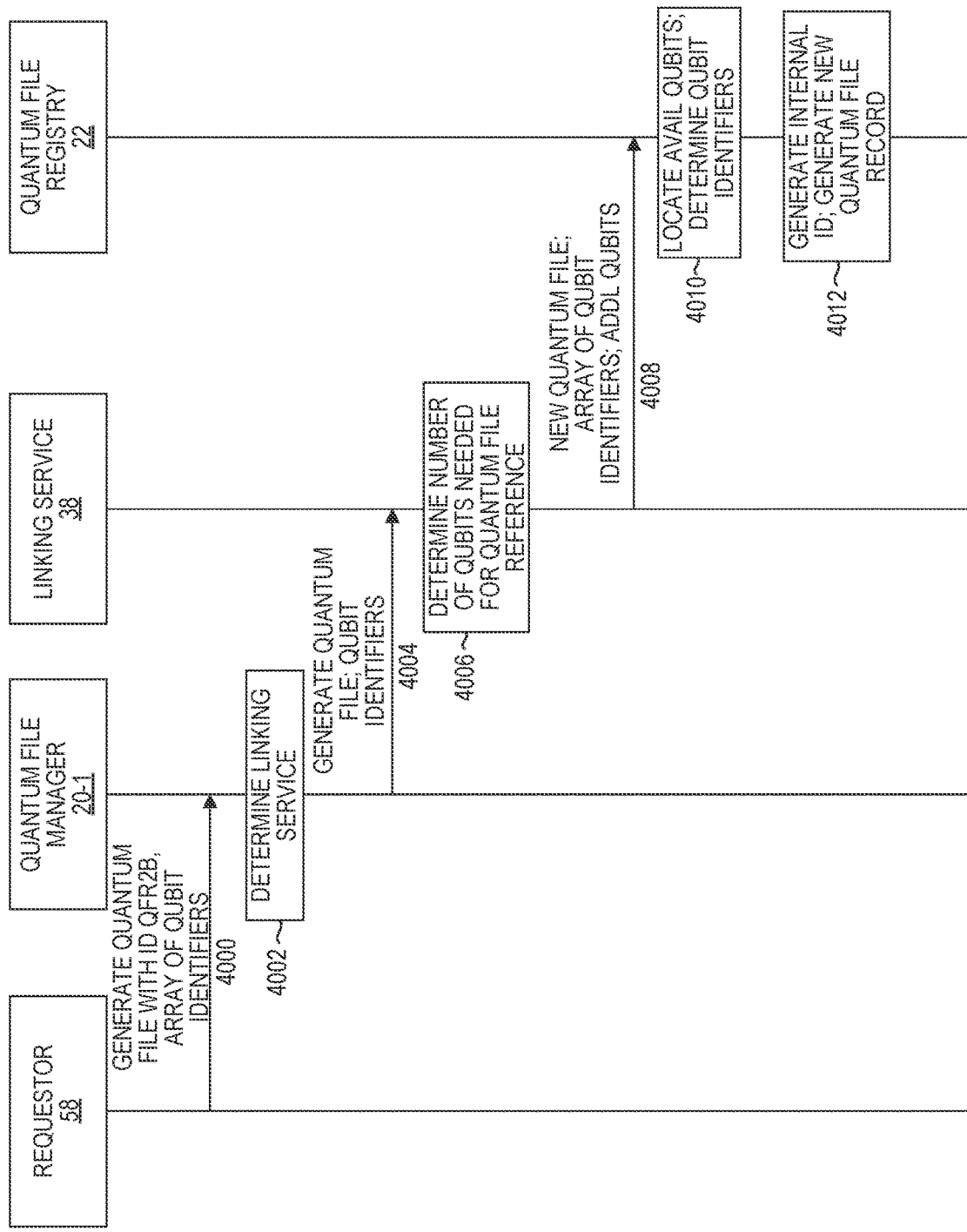
FIGS. 6A-6B are message sequence diagrams illustrating a sequence of messages between components and actions taken by such components to generate a quantum file, in accordance with another example.
Figure 6B:
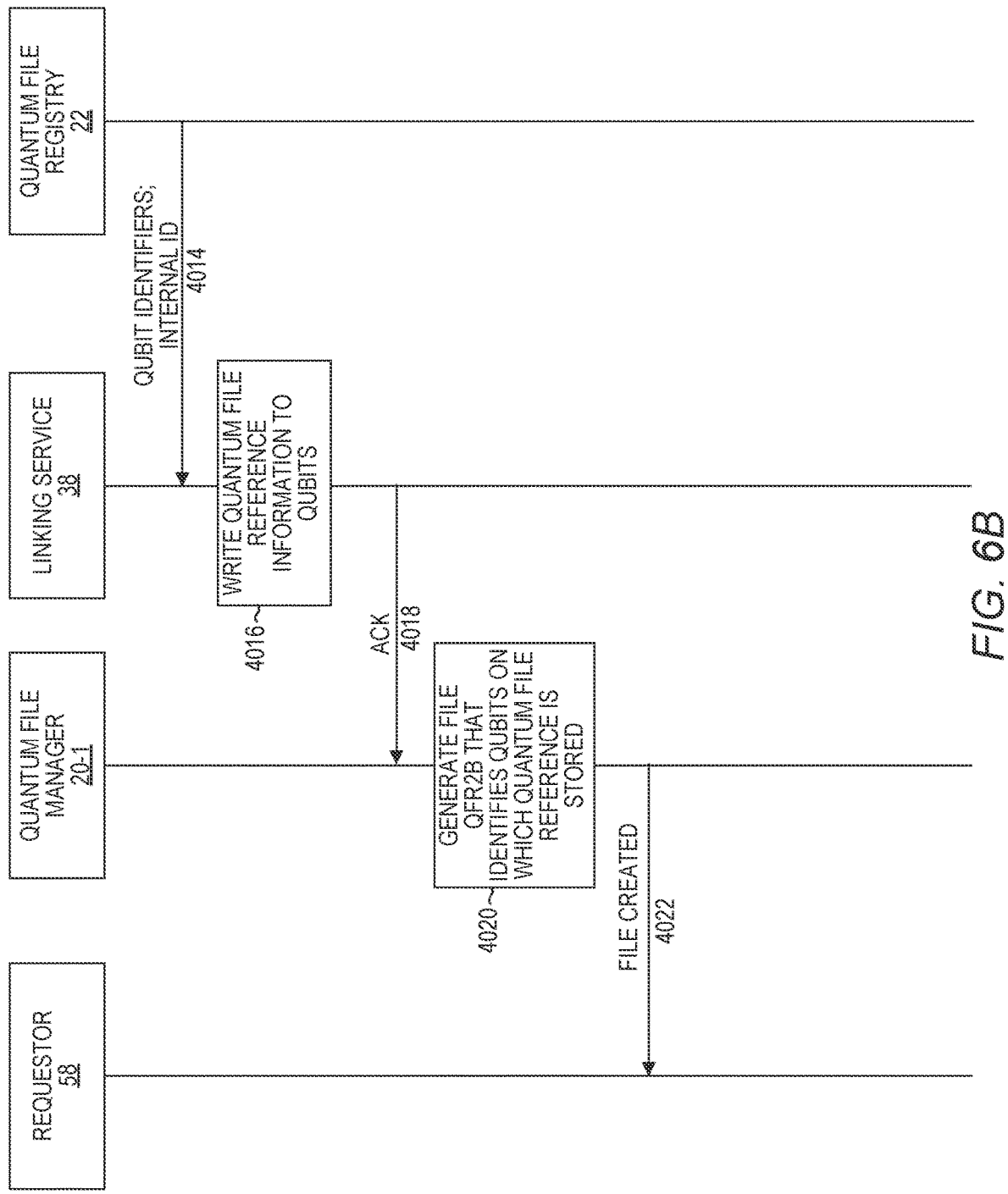

FIGS. 6A-6B are message sequence diagrams illustrating a sequence of messages between components and actions taken by such components to generate a quantum file, in accordance with another example. In this example, quantum file references are maintained as quantum, rather than classical, data. Assume that the requestor 58 desires to generate a new quantum file. Again, the requestor 58 may be, by way of non-limiting example, an operator that interacts with a quantum file generation user interface, or an application executing on the quantum computing system 12-1. The request includes a desired external file identifier, in this case "QFR2B", and a list of qubit identifiers to be used for the file. The requestor 58 sends the request to the quantum file manager 20-1 (FIG. 6A, block 4000).

The quantum file manager 20-1 receives the request, and determines an appropriate linking service to be associated with the new quantum file (FIG. 6A, block 4002). In this example, the quantum file manager 20-1 selects the linking service 38 as the appropriate linking service to be associated with the quantum file. The quantum file manager 20-1 communicates the information received from the requestor 58 to the linking service 38 (FIG. 6A, block 4004). The linking service 38 analyzes the request, and the number of qubits identified in the array of qubit identifiers, and determines a number of qubits that will be needed to store a new quantum file reference (FIG. 6A, block 4006). The linking service 38 sends a quantum file creation request to the quantum file registry 22, and provides the number of qubits needed for the quantum file reference, and the array of qubit identifiers (FIG. 6A, block 4008). The quantum file registry 22 locates the number of requested qubits on the quantum computing systems 12-1-12-3 for the quantum file reference (FIG. 6A, block 4010). The quantum file registry 22 generates a new internal file identifier, and stores the new internal file identifier and the qubit identifiers identified in the array of qubit identifiers (FIG. 6A, block 4012).

Referring now to FIG. 6B, the quantum file registry 22 sends the qubit identifiers for the quantum file reference and the internal identifier to the linking service 38 (FIG. 6B, block 4014). The linking service 38 then stores the information for the new quantum file reference across the qubits identified by the quantum file registry 22 (FIG. 6B, block 4016). The linking service 38 informs the quantum file manager 20-1 that the quantum file reference for the file ID QFR2B has been generated (FIG. 6B, block 4018). The quantum file manager 20-1 generates a classic file entitled QFR2B that identifies the qubits on which the new quantum file reference has been stored (FIG. 6B, block 4020). The quantum file manager 20-1 sends a message to the requestor 58 that the file QFR2B has been created (FIG. 6B, block 4022).

Figure 7:
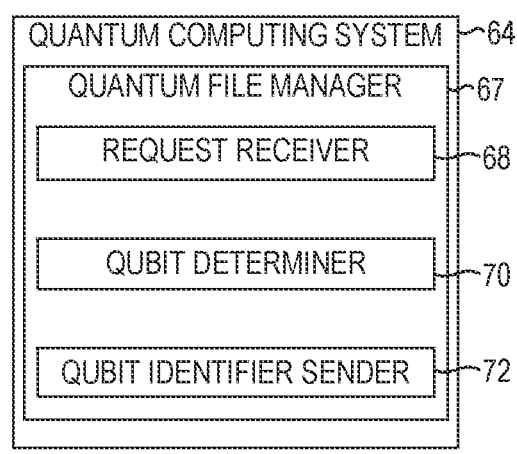
FIG. 7 is a block diagram of a quantum computing system according to one implementation.

FIG. 7 is a block diagram of a quantum computing system 64 according to one implementation. The quantum computing system 64 implements identical functionality as that described above with regard to the quantum computing system 12-1. The quantum computing system 64 includes a quantum file manager 67. The quantum file manager 67 includes a request receiver 68 that is to receive, from a requestor, a request to access a quantum file that comprises a plurality of qubits. The request receiver 68 may comprise executable software instructions to program a processor device to implement the functionality of receiving, by a quantum file manager executing on at least one processor device, from a requestor, a request to access a quantum file that comprises a plurality of qubits, may comprise circuitry including, by way of non-limiting example, an application-specific integrated circuit (ASIC), field-programmable gate array (FPGA), or may comprise a combination of executable software instructions and circuitry.

The quantum file manager 67 also includes a qubit determiner 70 that is to determine, for each respective qubit of the plurality of qubits, a qubit identifier of the respective qubit. In some implementations, the qubit determiner 70 may be implemented by a linking service, as discussed above. The qubit determiner 70 may comprise executable software instructions to program a processor device to implement the functionality of determining, for each respective qubit of the plurality of qubits, a qubit identifier of the respective qubit generating a snapshot layer for a storage unit, may comprise circuitry including, by way of non-limiting example, an ASIC, FPGA, or may comprise a combination of executable software instructions and circuitry.

The quantum file manager 67 also includes a qubit identifier sender 72 that is to send, to the requestor in response to the request, information that includes the qubit identifier for each respective qubit of the plurality of qubits. The qubit identifier sender 72 may comprise executable software instructions to program a processor device to implement the functionality of sending, to the requestor in response to the request, information that includes the qubit identifier for each respective qubit of the plurality of qubits, may comprise circuitry including, by way of non-limiting example, an ASIC, FPGA, or may comprise a combination of executable software instructions and circuitry.

Figure 8:
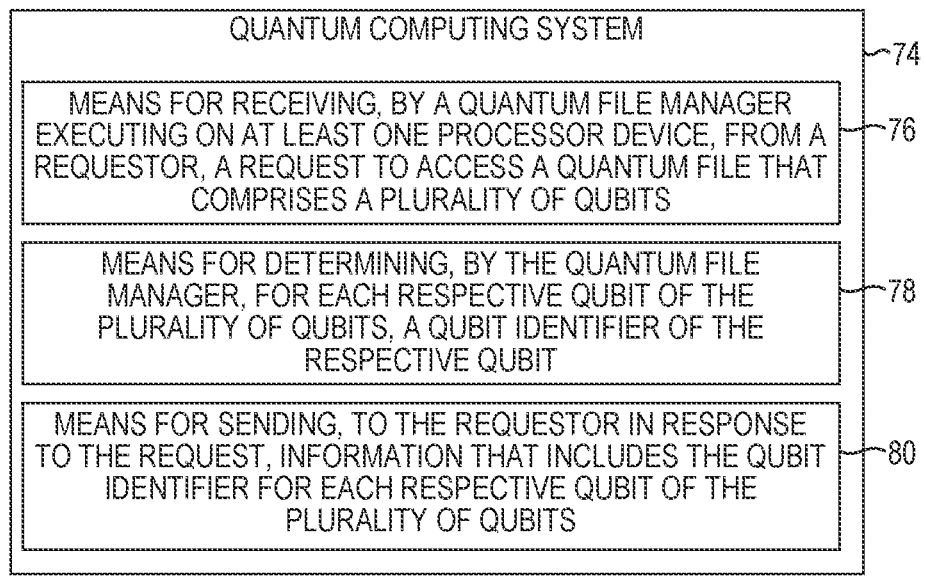
FIG. 8 is a block diagram of a quantum computing system according to another implementation.

FIG. 8 is a block diagram of a quantum computing system 74 according to additional implementations. The quantum computing system 74 implements identical functionality as that described above with regard to the quantum computing system 12-1. In this implementation, the quantum computing system 74 includes a means 76 for receiving, from a requestor, a request to access a quantum file that comprises a plurality of qubits. The means 76 may be implemented in any number of manners, including, for example, via the request receiver 68 illustrated in FIG. 7. The means 76 may, in some implementations, provide an application programming interface or other interprocess communications mechanism that may be invoked by an application to provide the means 76 with the request to access the quantum file. The means 76 may also, in some implementations, provide a user interface via which an operator can enter the request to access the quantum file.

The quantum computing system 74 includes a means 78 for determining, for each respective qubit of the plurality of qubits, a qubit identifier of the respective qubit. The means 78 may be implemented in any number of manners, including, for example, via the qubit determiner 70 illustrated in FIG. 7. The means 78 may, in some implementations, interface with a qubit registry that maintains real-time information regarding qubits implemented by one or more quantum computing systems, to determine, for each respective qubit of the plurality of qubits, a qubit identifier of the respective qubit.

The quantum computing system 74 includes a means 80 for sending, to the requestor in response to the request, information that includes the qubit identifier for each respective qubit of the plurality of qubits. The means 78 may be implemented in any number of manners, including, for example, via the qubit identifier sender 72 illustrated in FIG. 7.

Figure 9:
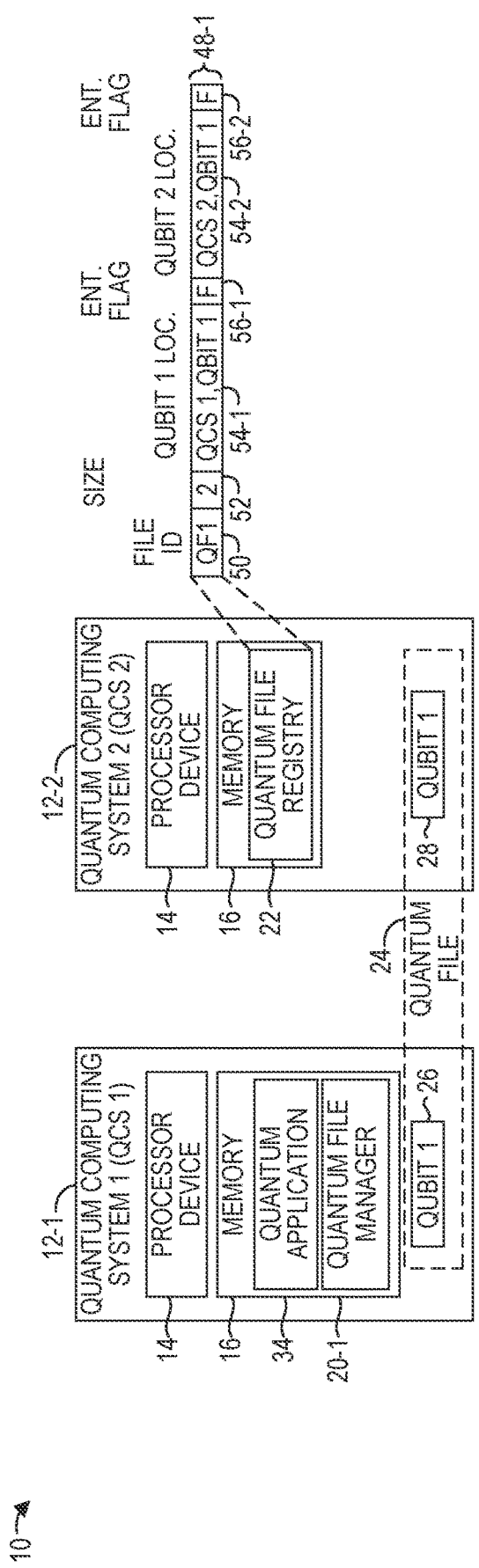
FIG. 9 is a simplified block diagram of the environment illustrated in FIG. 1, according to one example.

FIG. 9 is a simplified block diagram of the environment 10 illustrated in FIG. 1, according to one example. The environment 10 includes the quantum computing system 12-1, which includes the memory 16 and the at least one processor device 14. The at least one processor device 14 is coupled to the memory 16 to receive, by the quantum file manager 20-1 executing on the at least one processor device 14, from a requestor, such as the quantum application 34, a request to access the quantum file 24 that comprises the plurality of qubits 26 and 28. The quantum file manager 20-1 determines the qubit identifiers for the qubits 26 and 28. The quantum file manager 20-1 sends, to the quantum application 34, information that includes the qubit identifier for each respective qubit of the plurality of qubits 26 and 28.

Figure 10:
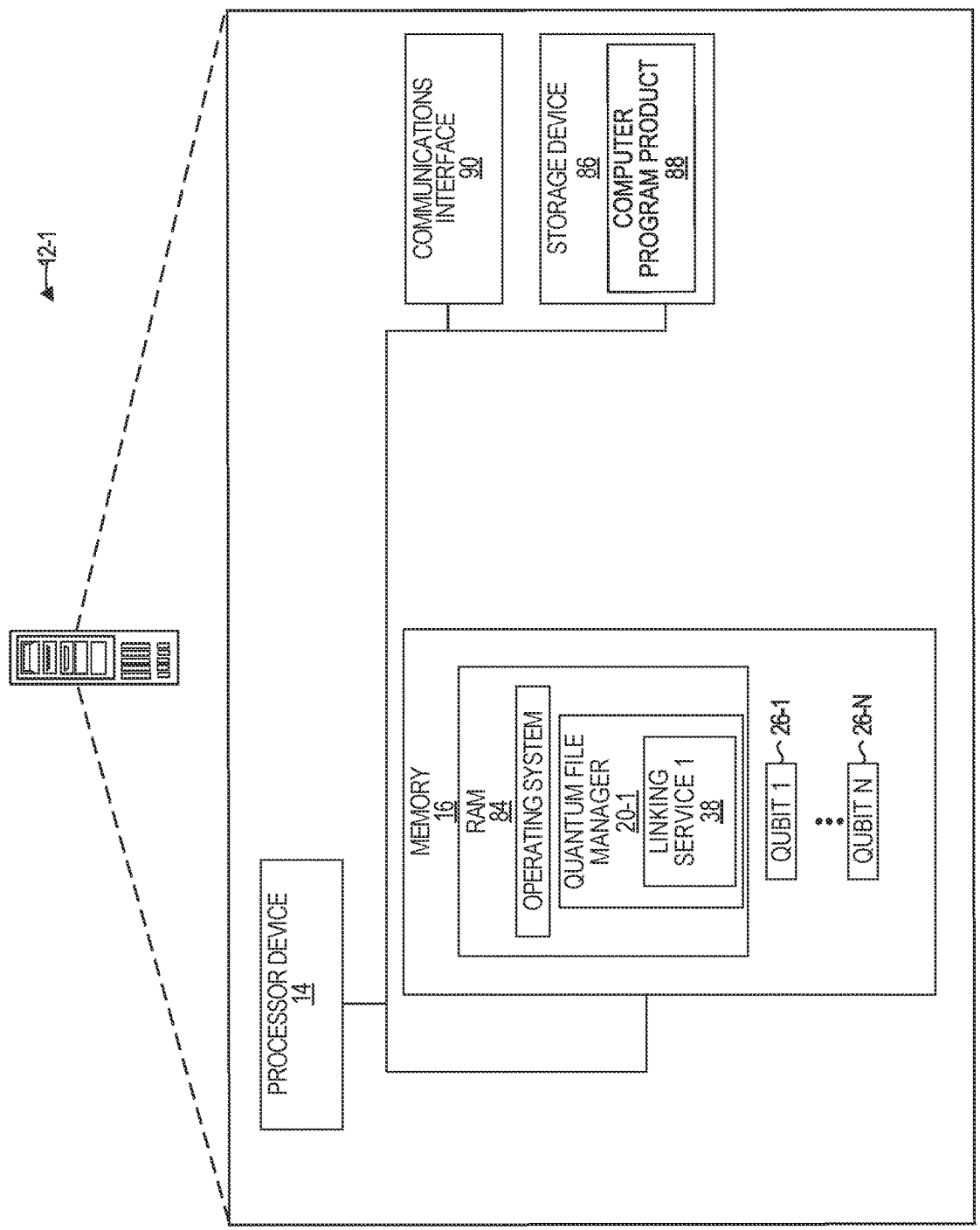
FIG. 10 is a block diagram of a quantum computing system suitable for implementing examples disclosed herein, according to one example.

FIG. 10 is a block diagram of the quantum computing system 12-1 suitable for implementing examples according to one example. The quantum computing system 12-1 may comprise any suitable quantum computing device or devices. The quantum computing system 12-1 can operate using classical computing principles or quantum computing principles. When using quantum computing principles, the quantum computing system 12-1 performs computations that utilize quantum-mechanical phenomena, such as superposition and entanglement. The quantum computing system 12-1 may operate under certain environmental conditions, such as at or near 0° Kelvin. When using classical computing principles, the quantum computing system 12-1 utilizes binary digits that have a value of either 1 or 0.

The quantum computing system 12-1 includes the processor device 14 and the system memory 16. The system memory 16 may include volatile memory 84 (e.g., random-access memory (RAM)). The quantum computing system 12-1 also includes one or more qubits 26-1-26-N.

The quantum computing system 12-1 may further include or be coupled to a non-transitory computer-readable storage medium such as a storage device 86, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 86 and other drives associated with computer-readable media and computer-usable media may provide non-volatile storage of data, data structures, computer-executable instructions, and the like.

A number of modules can be stored in the storage device 86 and in the volatile memory 84, including an operating system and one or more modules, such as the quantum file manager 20-1 and the linking service 38, each of which forms part of the quantum file management system 18 (FIG. 1). All or a portion of the examples may be implemented as a computer program product 88 stored on a transitory or non-transitory computer-usable or computer-readable storage medium, such as the storage device 86, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. An operator may also be able to enter one or more configuration commands through a keyboard (not illustrated), a pointing device such as a mouse (not illustrated), or a touch-sensitive surface such as a display device. The quantum computing system 12-1 may also include a communications interface 90 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a quantum computing system that includes a means for receiving, from a requestor, a request to access a quantum file that comprises a plurality of qubits; a means for determining, for each respective qubit of the plurality of qubits, a qubit identifier of the respective qubit; and a means for sending, to the requestor in response to the request, information that includes the qubit identifier for each respective qubit of the plurality of qubits.

Example 2 is a quantum computing system that includes a quantum file manager, the quantum file manager including a request receiver that is to receive, from a requestor, a request to access a quantum file that comprises a plurality of qubits; a qubit determiner that is to determine, for each respective qubit of the plurality of qubits, a qubit identifier of the respective qubit; and a qubit identifier sender that is to send, to the requestor in response to the request, information that includes the qubit identifier for each respective qubit of the plurality of qubits.

Example 3 is a quantum computing system that includes a quantum file registry, the quantum file registry to identify, for at least one quantum file, a plurality of qubit identifiers, each qubit identifier identifying a qubit implemented on a quantum computing system.

Example 4 is the quantum computing system of example 3, wherein the plurality of qubit identifiers comprises a first qubit identifier and a second qubit identifier, and wherein the first qubit identifier identifies a first qubit implemented on a first quantum computing system, and the second qubit identifier identifies a second qubit implemented on a second quantum computing system.

Example 5 is the quantum computing system of example 3, wherein the quantum file registry is further to maintain, for each respective qubit identifier of the plurality of qubit identifiers, an entanglement status that identifies a current entanglement state of the qubit corresponding to the respective qubit identifier.

Example 6 is the quantum computing system of example 3, wherein the quantum file registry is to identify, for each respective quantum file of a plurality of quantum files, a plurality of qubit identifiers, each qubit identifier identifying a qubit composing the respective quantum file.

Example 7 is a quantum file management system that includes a quantum file manager, a plurality of quantum linking services, and a quantum file registry, wherein the quantum file manager is to receive a request to access a particular quantum file of a plurality of quantum files, to determine a particular quantum linking service of the plurality of quantum linking services that is associated with the particular quantum file, and to cause the particular quantum linking service to obtain current qubit information from the quantum file registry for the particular quantum file; and wherein the particular quantum linking service is to obtain, from the quantum file registry, a plurality of qubit identifiers that identify qubits that compose the particular quantum file.

Example 8 is the quantum file management system of claim 7 wherein to determine the particular quantum linking service of the plurality of quantum linking services that is associated with the particular quantum file, the quantum file manager is further to access a quantum file reference that corresponds to the quantum file, and extract a quantum linking service identifier that identifies the particular quantum linking service from the quantum file reference.

Example 9 is a method for generating a quantum file that includes receiving, by a quantum file management system from a requestor, a request to generate a quantum file comprising a plurality of qubits, the request including a quantum assembly (QASM) file identifier that identifies a QASM file; parsing the QASM file to identify a quantity of qubits needed to implement operations identified in the QASM file; identifying a set of qubits equal to the quantity of qubits; storing a quantum file record that identifies the set of qubits; and sending qubit identifiers that identify the qubits in the set of qubits to the requestor.

Example 10 is the method of example 9 wherein identifying the set of qubits equal to the quantity of qubits includes determining that the qubits in the set of qubits are available.

Example 11 is the method of example 9 wherein a first qubit in the set of qubits is implemented on a first quantum computing system and a second qubit in the set of qubits is implemented on a second quantum computing system.

Example 12 is the method of example 9 further comprising receiving, from the requestor, a request to delete the quantum file, modifying a quantum file registry to indicate that the quantum file no longer exists, and storing metadata that identifies the qubits in the set of qubits as being available.

Example 13 is a quantum computing system comprising one or more memories and one or more processor devices, the one or more processor devices to receive, from a requestor, a request to generate a quantum file comprising a plurality of qubits, the request including a quantum assembly (QASM) file identifier that identifies a QASM file; parse the QASM file to identify a quantity of qubits needed to implement operations identified in the QASM file; identify a set of qubits equal to the quantity of qubits; store a quantum file record that identifies the set of qubits; and send qubit identifiers that identify the qubits in the set of qubits to the requestor.

Example 14 is the quantum computing system of example 13 wherein the one or more processor devices are further to maintain a plurality of qubit identifiers, each qubit identifier identifying a qubit implemented on a quantum computing system, and maintain metadata about each qubit identified by a qubit identifier, the metadata comprising information that indicates whether the qubit is available to be allocated to the quantum file.

Example 15 is the quantum computing system of example 14, wherein the metadata further comprises information identifying an entanglement state of each qubit identified by a qubit identifier.

Example 16 is a method comprising receiving, by a quantum file management system from a requestor, a request to copy a quantum file reference from a first quantum computing system to a second quantum computing system; accessing the quantum file reference on the first quantum computing system; generating a copy of the quantum file reference on the second quantum computing system; and removing the quantum file reference from the first quantum computing system.

Example 17 is the method of example 16 further comprising determining, by the quantum file management system, a linking service associated with the second quantum computing system; and modifying the copy of the quantum file reference on the second quantum computing system to include a reference to the linking service associated with the second quantum computing system.

Individuals will recognize improvements and modifications to the preferred examples of the disclosure. All such improvements and modifications are considered within the scope of the concepts disclosed herein and the claims that follow.

What is claimed is:

1. A method, comprising:
    in response to a request from a requestor to access a quantum file that encodes contextually-related data across a plurality of qubits, identifying, by a quantum file manager executing on one or more quantum computing systems, a quantum file registry record that stores a qubit identifier for each qubit in the quantum file, wherein the plurality of qubits encode the contextually-related data in a particular sequential order, and wherein the quantum file comprises a field comprising order data indicative of the particular sequential order;
    accessing, by the quantum file manager, the quantum file registry record to determine, for each respective qubit of the plurality of qubits, information that includes the qubit identifier of the respective qubit and a status of the respective qubit;
    providing, by the quantum file manager to the requestor, the qubit identifier for each respective qubit of the plurality of qubits, the status for each respective qubit of the plurality of qubits, and the order data indicative of the particular sequential order;
    receiving, by the quantum file manager, location change information that indicates that data stored on a first qubit of the plurality of qubits has been moved to a second qubit that is not in the plurality of qubits;
    removing, from the quantum file registry record, information regarding the first qubit; and
    adding, to the quantum file registry record, information identifying the second qubit.

2. The method of claim 1, further comprising:
    determining, for each respective qubit of the plurality of qubits, that the respective qubit is in an entanglement state of entangled or not entangled; and
    wherein the status is based on the entanglement state of the respective qubit.

3. The method of claim 2, wherein, for each respective qubit of the plurality of qubits, the status identifies the entanglement state of the respective qubit.

4. The method of claim 3, wherein an entanglement state of the first qubit of the plurality of qubits is that the first qubit is entangled, and an entanglement state of a third qubit of the plurality of qubits is that the third qubit is not entangled.

5. The method of claim 1, wherein the qubit identifier for the first qubit of the plurality of qubits identifies a first quantum computing system and the qubit identifier for a third qubit of the plurality of qubits identifies a second quantum computing system.

6. The method of claim 1, further comprising identifying, by the quantum file manager, a linking service for the quantum file.

7. The method of claim 6, wherein identifying, by the quantum file manager, the linking service for the quantum file further comprises accessing, by the quantum file manager, a quantum file reference that corresponds to the quantum file, wherein the quantum file reference identifies the linking service.

8. The method of claim 1, further comprising:
    prior to receiving the request to access the quantum file, receiving, by the quantum file manager from a file creation requestor, a file creation request to create the quantum file, the file creation request including a quantum assembly language (QASM) file identifier that identifies a QASM file;
    analyzing, by the quantum file manager, the QASM file to determine a number of qubits for the quantum file;
    obtaining, from a qubit registry, qubit identification information that identifies a plurality of available qubits;
    generating a quantum file reference that corresponds to the quantum file, the quantum file reference comprising information that identifies the available qubits; and
    returning, to the file creation requestor, an identifier that identifies the quantum file reference.

9. The method of claim 8, wherein the file creation request includes the identifier.

10. The method of claim 8, wherein the first qubit of the plurality of qubits is implemented by a first quantum computing system and a third qubit of the plurality of qubits is implemented by a second computing system.

11. The method of claim 8, wherein the information that identifies the available qubits comprises a plurality of qubit identifiers, each qubit identifier corresponding to one of the plurality of qubits.

12. The method of claim 1, further comprising:

prior to receiving the request to access the quantum file, receiving, by the quantum file manager from a file creation requestor, a file creation request to create the quantum file, the file creation request identifying the plurality of qubits;

determining, based at least in part on the file creation request, a quantity of metadata qubits for maintaining metadata about the quantum file; and generating a quantum file reference, using the metadata qubits, that corresponds to the quantum file, the quantum file reference comprising information that identifies the plurality of qubits.

13. The method of claim 12, wherein generating the quantum file reference using the metadata qubits comprises storing, to the metadata qubits, the information that identifies the plurality of qubits.

14. The method of claim 12, further comprising obtaining, from a qubit registry, qubit identification information that identifies the metadata qubits.

15. A quantum computing system, comprising:

a memory; and at least one processor device coupled to the memory to:

in response to a request from a requestor to access a quantum file that encodes contextually-related data across a plurality of qubits, identify, by a quantum file manager, a quantum file registry record that stores a qubit identifier for each qubit in the quantum file, wherein the plurality of qubits encode the contextually-related data in a particular sequential order, and wherein the quantum file comprises a field comprising order data indicative of the particular sequential order;

access, by the quantum file manager, the quantum file registry record to determine, for each respective qubit of the plurality of qubits, information that includes the qubit identifier of the respective qubit and a status of the respective qubit;

provide, by the quantum file manager to the requestor, the qubit identifier for each respective qubit of the plurality of qubits, the status for each respective qubit of the plurality of qubits, and the order data indicative of the particular sequential order;

receive, by the quantum file manager, location change information that indicates that data stored on a first qubit of the plurality of qubits has been moved to a second qubit that is not in the plurality of qubits;

remove, from the quantum file registry record, information regarding the first qubit; and add, to the quantum file registry record, information identifying the second qubit.

16. A computer program product stored on a non-transitory computer-readable storage medium and including instructions to cause a processor device to:

in response to a request from a requestor to access a quantum file that encodes contextually-related data across a plurality of qubits, identify, by a quantum file manager executing on one or more quantum computing systems, a quantum file registry record that stores a qubit identifier for each qubit in the quantum file, wherein the plurality of qubits encode the contextually-related data in a sequential order, and wherein the quantum file comprises a field comprising order data indicative of the particular sequential order;

access, by the quantum file manager, the quantum file registry record to determine, for each respective qubit of the plurality of qubits, information that includes the qubit identifier of the respective qubit and a status of the respective qubit;

provide, by the quantum file manager to the requestor, the qubit identifier for each respective qubit of the plurality of qubits, the status for each respective qubit of the plurality of qubits, and the order data indicative of the particular sequential order;

receive, by the quantum file manager, location change information that indicates that data stored on a first qubit of the plurality of qubits has been moved to a second qubit that is not in the plurality of qubits;

remove, from the quantum file registry record, information regarding the first qubit; and add, to the quantum file registry record, information identifying the second qubit.

\* \* \* \* \*